United States Patent [19]

Kotliar et al.

[11] Patent Number: 4,558,019

[45] Date of Patent: Dec. 10, 1985

[54] PERICLASE REFRACTORY BRICK WITH OXYHYDROCARBON COMPONENT

[75] Inventors: Abraham M. Kotliar, Union County; John P. Sibilia, Essex County, both of N.J.; Ronald H. Hughes; Richard A. Landy, both of Centre County, Pa.

[73] Assignee: Allied Corporation, Morris Township, Morris County, N.J.

[21] Appl. No.: 572,727

[22] Filed: Jan. 20, 1984

[51] Int. Cl.$^4$ ............................................. C04B 35/52
[52] U.S. Cl. .................................... 501/101; 501/109; 501/108
[58] Field of Search .................. 501/101, 109, 108

[56] References Cited

U.S. PATENT DOCUMENTS

| | | | |
|---|---|---|---|
| 4,292,082 | 9/1981 | Danjyo et al. | 501/101 |
| 4,407,972 | 10/1983 | Brezny | 501/101 |
| 4,454,239 | 6/1984 | Cassens | 501/101 |

Primary Examiner—William R. Dixon, Jr.
Assistant Examiner—Ann M. Knab
Attorney, Agent, or Firm—A. M. Doernberg; G. H. Fuchs

[57] ABSTRACT

A periclase refractory composition comprising magnesium oxide granules, carbon granules and a carbonaceous binding material capable of undergoing pyrolytic decomposition. Added to the periclase refractory composition is at least one oxyhydrocarbon compound selected from the group consisting of (a) acyclic carboxylic acids, (b) oxidized polyolefin waxes, (c) poly(alkylene oxides) and ethers thereof, (d) olefin copolymers, (e) polyvinyl alcohol, and (f) furan polymers.

7 Claims, No Drawings

PERICLASE REFRACTORY BRICK WITH OXYHYDROCARBON COMPONENT

DESCRIPTION

BACKGROUND OF THE INVENTION

The present invention relates to mixtures of periclase and carbonaceous materials, and especially to such mixtures formed into bricks.

Periclase (magnesium oxide or magnesia) bricks are a form of refractory brick used in steel making, foundry operations and particularly in basic oxygen furnaces, where exposure to a basic slag is encountered. Such bricks are made by mixing a major proportion of magnesium oxide granules of defined particle size distribution, a carbonaceous binding material capable of undergoing pyrolytic decomposition (e.g. pitch of a defined softening point) and, usually, a graphitic granular carbon material such as various forms of carbon black. After mixing, the formulation is compressed under extremely high pressures (e.g. greater than 5,000 pounds per square inch or 34.5 MPa, preferably greater than 10,000 pounds per square inch or 69 MPa), at a controlled temperature (e.g. 175°–190° C.). The resultant "green" brick has a density of at least about 180 pounds per cubic foot (2.9 g/cm$^3$ or 2,880 kg/m$^3$). Thereafter, the green brick is annealed or tempered at temperatures such as 260°–320° C. to form the final brick which is used in the furnace. During exposure to the much hotter temperatures present in the furnace, the carbonaceous binding material is coked.

It is known that the properties, and especially the useful life, of the product brick correlates strongly with green brick density. Therefore a variety of techniques, including increased pressure and optimized compression temperature, have been employed to increase this value.

BRIEF DESCRIPTION OF THE INVENTION

It has been discovered that certain oxyhydrocarbon compounds, when added to periclase refractory compositions, enable the compositions to be formed in bricks with increased green brick density under equivalent pyrolytic decomposition. Thus the present invention includes an improvement in a periclase refractory composition comprising magnesium oxide granules, carbon granules and a carbonaceous binding material capable of undergoing pyrolytic decomposition. In the improvement, the periclase refractory composition further comprises at least one oxyhydrocarbon compound selected from the group consisting of:

(a) acyclic carboxylic acids of at least 14 carbons,
(b) oxidized polyolefin waxes,
(c) poly(alkylene oxides) and ethers thereof,
(d) copolymers of an olefin with at least one monomer selected from the group consisting of unsaturated carboxylic acids, vinyl esters and vinyl alcohol;
(e) polyvinyl alcohol; and
(f) furan polymers.

The present invention further includes a refractory brick formed by compression and subsequent annealing of the improved periclase refractory composition.

DETAILED DESCRIPTION OF THE INVENTION

The first three components of the present refractory composition, which are magnesium oxide granules, carbonaceous binding agent and carbon granules, can be those conventionally used in periclase refractory bricks. In particular, both natural magnesia and synthetic magnesia formed by calcined Mg(OH)$_2$ plus CaCl$_2$ otherwise, may be used. It is generally desirable to control the particle size distribution of the magnesia granules used; and this may be conveniently accomplished by screening magnesia granules into fractions of various sizes and then mixing granules from different fractions in defined proportions to give a desired distribution selected to achieve closest packing. The magnesia granules may contain various metal oxides as contaminants such as ferric oxide, calcium oxide, silica or alumina and may also contain anions such as sulfides or chlorides in minor amounts. Generally, magnesia granules constitute at least about 70%, frequently at least about 90%, by weight, of the total mixture.

Pitch is used herein to mean the least volatile portion of the product of distillation of tar and especially of coal tar, but should not be understood to exclude minor amounts of more volatile components.

Carbon particles and especially carbon black may be added as described in U.S. Pat. No. 3,236,664. Other forms of carbon particles such as graphite or hard pitch may also be used. Other additives such as nitrates or sulfates are also contemplated. The proportion of carbon particles may vary widely among formulations, constituting as little as 0.5%, or as much as 50% of the total composition, by weight.

The oxyhydrocarbon may be selected from any of groups (a) through (d), or may constitute a mixture of such compounds. Aliphatic carboxylic acids that may be used include aliphatic acids such as those of the formula (CH$_3$CH$_2$)$_n$COOH, with n equal to 12, 14, 16, 18 or 20, or branched isomers of these compounds. Corresponding acids with single or multiple olefins unsaturation, such as oleic and palmitic acids, may also be used. Mixtures of such acids, available from a variety of natural sources (e.g. coconut, corn, soy or tall oil), may also be used.

Oxidized polyolefin waxes may also be used. In general, it is preferred that these compounds have weight average molecular weights between about 1,000 and 20,000, preferably between about 4,000 and about 9,000. They can be formed by air oxidation of polyolefins in the solid state and are commercially available from Allied Corporation under the A-C trademarks as AC-316, AC-629 or AC-656.

The oxyhydrocarbon can also be a poly(alkylene oxide) such as polyethylene oxide H(CH$_2$CH$_2$O)$_n$H. Such materials are available in a variety of molecular weights under the trademarks Carbowax and Polyox (among others) with the number following the trademark usually indicating the weight average molecular weight. Preferred in this group are the polyethylene oxides H(CH$_2$CH$_2$O)$_n$H of weight average molecular weight 100 to 8,000, with n being an average 6 to 120.

Another group of suitable oxyhydrocarbon compounds is polyvinyl alcohol and furan polymers. The amount of the oxyhydrocarbon is generally determined as a weight percentage of the carbonaceous binder employed, and may vary from about 1 to about 30% on this basis, preferably between about 2 and about 20%. It will be appreciated that if the binder is 2% of the total composition, the oxyhydrocarbon will constitute only 0.02–0.5% of the total composition. This is important if the oxyhydrocarbon volatilizes or decarboxylates during annealing or coking, since the effect of even complete loss of the oxyhydrocarbon or complete decarboxylation to generate carbon dioxide during either step will have minimal effects on the properties of the brick.

While the invention is not tied to any particular theory, it is postulated that the oxyhydrocarbon may act as a surfactant to improve wetting of the magnesia granules, and possibly also the carbon granules, by the binding material. Since this occurred during mixing, and especially during brick formation when magnesia granules are crushed to expose fresh magnesia surface, the oxyhydrocarbon need only be stable under conditions of mixing and compression (e.g. up to about 210° C.). Many of the suitable oxyhydrocarbons such as stearic acid decarboxylate, otherwise decompose, polymerize or volatilize under the annealing conditions (e.g. 260°–360° C.) or the coking conditions (e.g. 360°–600° C.). The effect of wetting the magnesia surface as it forms is to lubricate movement of the granules in response to the compression forces to assume denser configurations. In the absence of such lubrication, increased pressures are required to achieve equivalent densities.

The following examples are intended to illustrate the invention without limiting the invention defined by the claims that follow.

EXAMPLE 1–6

The Effect of Stearic Acid

To an 80 gram sample of periclase mix containing 2 wt % carbon black and 4 wt % petroleum pitch (120° C. softening point), 0.6 gram of stearic acid was added. The carefully mixed sample was placed into a heavy wall 1½ inch diameter electrically heated steel cylinder. At temperature of 210°±2° C. the thermocouple located in the center of the mix was removed and a pressure of 7,500 to 11,900 psi (51.7 to 82.1 MPa) applied using a model TTD-20,000 lbs Instron in the compression mode. After a compression cycle of 10 seconds the formed sample was removed and the density was determined from the weight of the disk in air and water. Similar samples were made at pressures between 7,600 and 11,250 psi (52.4–77.6 MPa). Table I lists the conditions and resulting density along with standard mix controls containing no additive.

TABLE I

| Example | Temperature °C. | Pressure PSI (MPa) | Stearic Acid g. | Density lbs/ft³ | (kg/m³) |
|---|---|---|---|---|---|
| 1 | 212 | 7500 (51.7) | 0 | 189.0 | (3,028) |
| 2 | 212 | 7500 (51.7) | 0 | 188.9 | (3,026) |
| 3 | 211 | 11,900 (82.0) | 0 | 190.1 | (3,045) |
| 4 | 209 | 7650 (52.7) | .6 | 192.7 | (3,087) |
| 5 | 210 | 7575 (52.2) | .6 | 191.9 | (3,074) |
| 6 | 210 | 11,250 (77.5) | .6 | 193.1 | (3,093) |

EXAMPLE 7–8

The Effect of Polyethylene Oxide

To an 80 gram sample of periclase mix containing 2 wt % carbon black and 4 wt % petroleum pitch, (120° softening point), 0.3 g of polyethylene oxide (300,000 MW) was added. The carefully mixed sample was placed into a heavy wall 1½ inch (3.8 cm) diameter electrically heated steel cylinder. At temperatures of 210°±2° C. the thermocouple located in the center of the mixture was removed and a pressure of 10,900 to 11,900 psi (75.1–82.0 MPa) was applied using a model TTD-20,000 Instron in the compression mode. After a compression cycle of 10 seconds the formed brick was removed and the density was determined from the sample weight in air and water. Table II lists the conditions and resulting densities along with a standard mix control containing no additive.

TABLE II

| Example | Temperature °C. | Polyethylene oxide | Density lbs/ft³ | (kg/m³) |
|---|---|---|---|---|
| 7 | 211 | 0 | 190.1 | (3,045) |
| 8 | 211 | 0.3 g | 191.6 | (3,068) |

EXAMPLE 9–12

The Effect of Carbowax 8000

Four mixtures composed of 100 parts periclase, 2.5 parts of thermal black, 2 parts calcium nitrate, 20 parts of graphite and a binder composed of 4.4 parts of 4.8 parts of pitch having a softening point of 120° C.—Carbowax combination were mixed at 190°–230° C. and then transferred to a mold having a temperature of 150° C. and compacted under a pressure of 8000 psi (55.1 MPa). The resulting properties are listed in Table III.

TABLE III

Effect of Carbowax Addition of NARTAR-18

| Example | 9 | 10 | 11 | 12 |
|---|---|---|---|---|
| Pitch 120° C. softening pt. | 4.4 | 4.0 | 4.8 | 4.0 |
| Carbowax 8000 | 0 | 0.4 | 0 | .8 |
| Density (pcf) Pressed | 177.4 | 178.6 | 179.5 | 177.4 |
| (kg/m3) | (2,842) | (2,861) | (2,876) | (2,842) |
| Tempered | 173.9 | 175.4 | 176.0 | 174.2 |
| | (2,786) | (2,810) | (2,820) | (2,791) |

EXAMPLE 13–16

The Effect of Carbowax 8000 Oxidized Polyethylene Waxes and Ethylene Copolymers of Acrylic Acid to NARTAR-18

A series of 4 mixtures were used as in Examples 9–12 composed of 100 parts periclase, 2.5 parts thermal black, 2 parts calcium nitrate, 20 parts graphite, 4.4 parts 120° C. softening pt. pitch and additions Carbowax 8000 AC 656 and AC 580.

AC 656 is an oxidized homopolymer of polyethylene having an acid number of 15 mg KOH/gm and a softening point of 100° C.

AC 580 is a copolymer of ethylene and acrylic acid with a molecular weight of about 3000 and an acid number of 75 mg KOH/gm and a softening point of 100° C.

TABLE IV

The Addition of Carbowax, Oxidized Polyethylene Waxes and Ethylene Copolymers of Acrylic Acid to NARTAR-18

| Example | 13 | 14 | 15 | 16 |
|---|---|---|---|---|
| Pitch 120° C. softening pt. | 4.4 | 4.0 | 4.0 | 4.0 |
| Carbowax 8000 | | 0.4 | | |
| AC 656 | | | 0.4 | |
| AC 580 | | | | 0.4 |
| Density pcf (kg/m3) | 174.8 | 176.2 | 175.7 | 175.8 |
| | (2,800) | (2,823) | (2,815) | (2,816) |

We claim:

1. In a periclase refractory composition comprising magnesium oxide granules, carbon granules and a carbonaceous binding material capable of undergoing pyrolytic decomposition, the improvement wherein the periclase refractory composition further comprises at least one oxyhydrocarbon compound selected from the group consisting of:

(a) acyclic carboxylic acids of at least 14 carbons, (b) oxidized polyolefin waxes, (c) poly(alkylene oxides) and ethers thereof, (d) copolymers of an olefin with at least one monomer selected from the group consisting of unsaturated carboxylic acids, vinyl esters and vinyl alcohol; and (e) polyvinyl alcohol.

2. The periclase refractory composition of claim 1 wherein the oxyhydrocarbon is present in an amount between about 1% and about 30% by weight of carbonaceous binding material.

3. The periclase refractory composition of claim 2 wherein said amount is between about 2% and about 20%.

4. The periclase refractory composition of claim 1 wherein said oxyhydrocarbon is at least one aliphatic carboxylic acid of 14–22 carbons.

5. The periclase refractory composition of claim 1 wherein said oxyhydrocarbon is a polyethylene oxide.

6. The periclase refractory composition of claim 5 wherein said polyethylene oxide has a weight average molecular weight between about 100 and about 8,000.

7. The periclase refractory composition of claim 1 wherein said oxyhydrocarbon is a copolymer of ethylene and acrylic acid.

* * * * *